July 17, 1956   A. D. FERGUSON   2,755,355
HIGH SPEED CIRCUIT BREAKERS
Filed May 11, 1951   4 Sheets-Sheet 1

Inventor:
Alexander D. Ferguson,
by Ernest C. Britton
His Attorney.

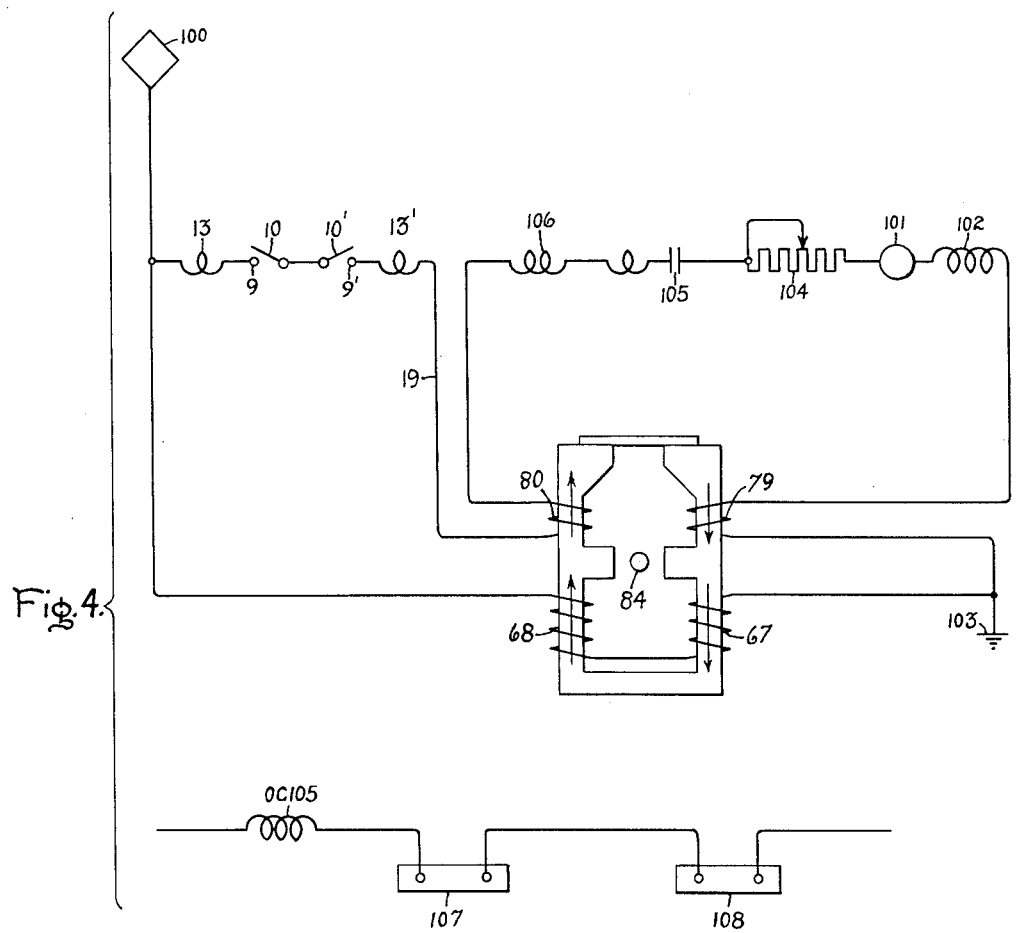

United States Patent Office 2,755,355
Patented July 17, 1956

2,755,355

HIGH SPEED CIRCUIT BREAKERS

Alexander D. Ferguson, London, England, assignor to General Electric Company, a corporation of New York Application May 11, 1951, Serial No. 225,689

9 Claims. (Cl. 200—102)

This invention relates to electric circuit breakers and in particular to circuit breakers of the type employed in electric traction equipments for interrupting the main motor circuits in response to fault conditions. The invention has for its object to provide an electric circuit breaker which will operate to open the contacts thereof with high speed in response to fault conditions but will discriminate between fault conditions in the traction motor circuit and normal overload currents therein so as not to open said contacts in response to normal overload currents.

According to the present invention, an electric circuit breaker of the kind referred to is provided with a holding magnet adapted when energized to retain the contacts in the closed position, said holding magnet cooperating with an armature so as to retain the latter in position holding the contacts closed against a pull-off spring or other biasing means, and the magnetic system comprising the magnet and armature is provided with two controlling coils connected or adapted to be connected in the main traction circuit at or electrically adjacent the two ends, respectively, of said circuit, one of said coils, which is that connected or adapted to be connected at the grounded end of the traction motor circuit, being arranged to assist the main excitation of the holding magnet, whereas the other of said coils is arranged to oppose said main excitation. With this arrangement during normal conditions the two controlling windings act in opopsition to one another in the magnetic circuit and the contacts are retained in the closed position. In the event of a ground fault occurring in the traction motor circuit at any point between the two demagnetizing windings, that controlling winding at the grounded end of the main circuit will be short-circuited. The other controlling winding, which is still carrying the traction circuit current, therefore acts in opposition to the main excitation so as to allow the armature and the contacts to move to the open position. Conveniently the two controlling windings may be mounted on the two poles, respectively, of the holding magnet.

In practice the most common fault resulting in excessive current in the traction motor circuits is flashover across a traction motor armature, which may be due, for example, to line surges, accumulation of brake shoe dust, brushes jumping out of engagement with the commutator, or moisture due to condensation. All such faults, which are in the first instance, or develop into, ground faults, will result in diversion of current from one part of the traction motor circuit to cause operation of the circuit breaker in the manner above described. On the other hand, excessive motor current due purely to overloading of the motors does not result in different currents at the two ends of the circuit and the circuit breaker remains closed; the motor may be protected against such overloading by the usual overcurrent relay operating in conjunction with a line switch provided in addition to the circuit breaker according to the invention. The holding magnet may conveniently comprise two parallel limbs united by a yoke, and the controlling windings may be located respectively on said two limbs, preferably adjacent the armature, that is to say at the ends of the limbs remote from the yoke.

According to a further feature of the invention, the circuit breaker is provided with contact closing means which, after operation to close the contacts and bring the armature into engagement with the holding magnet, are retracted or otherwise displaced from the return path of an actuating member for the contacts and said armature so that the latter is free to return upon demagnetization of the holding magnet. The arrangement is employed in conjunction with a line switch and includes control circuits whereby in reclosing the circuit breaker provided according to the invention the line switch initially remains in the open position and is only closed when the circuit breaker is closed. The desired result may conveniently be obtained by means of interlock contacts operated by the circuit breaker contacts and by the actuating means, which interlock contacts are connected in series with one another or otherwise arranged so that the contacts must be closed and the actuating means must be retracted or otherwise displaced as above set forth before the operating circuit for the line switch is completed. In general the actuating means will comprise a compressed air piston as commonly employed for operating line switches and contactors in traction systems although it will be understood that the invention is not limited in this respect.

According to a further feature of the invention, the holding magnet is provided with means for bypassing magnetic flux from parts of the pole pieces on which the controlling windings are mounted, said means including a variable air gap whereby the value of fault current at which the armature is released may be adjusted at will.

The holding coil may be energized directly from the line or from an auxiliary supply source as may be expedient in any particular application of the invention.

According to a further feature of the invention, the circuit breaker comprises two pairs of cooperating contacts connected in series with one another and a pair of separate arc chutes associated respectively with said pairs of contacts. The arc chutes may be of any desired construction but preferably are each arranged in accordance with the invention set forth and claimed in British Letters Patent No. 478,824 whereby the circuit breaker comprises in effect four arc chutes providing, on interruption of the circuit, four arcs connected in series with one another.

According to another feature of the invention, the moving contact or contacts of the circuit breaker are mounted at one end of a pivoted lever, the other end of which carries the armature cooperating with the holding magnet, and an operating piston or other means for the contacts are arranged to actuate said lever to close the contacts and after such actuation to release the lever so that on demagnetization of the holding magnet the lever is free to move to the contact open position. Where the circuit breaker comprises a pair of arc chutes and moving contacts such as hereinbefore indicated, said lever is preferably formed with or coupled with two contact-carrying arms and may include a further arm adapted to be operated by said actuating means; said further arm may be positioned for movement between the two arc chutes.

A preferred embodiment of circuit breaker according to the invention will now be described by way of example with reference to the accompanying drawings, Fig. 1 being a side elevation, partly in section, of the circuit breaker, Fig. 2 being a rear elevation, partly in section, and Fig. 3 being a sectional plan view.

Fig. 4 is an electrical circuit diagram showing the method of connection of the circuit breaker according to the invention in a simplified traction system.

Figure 1:
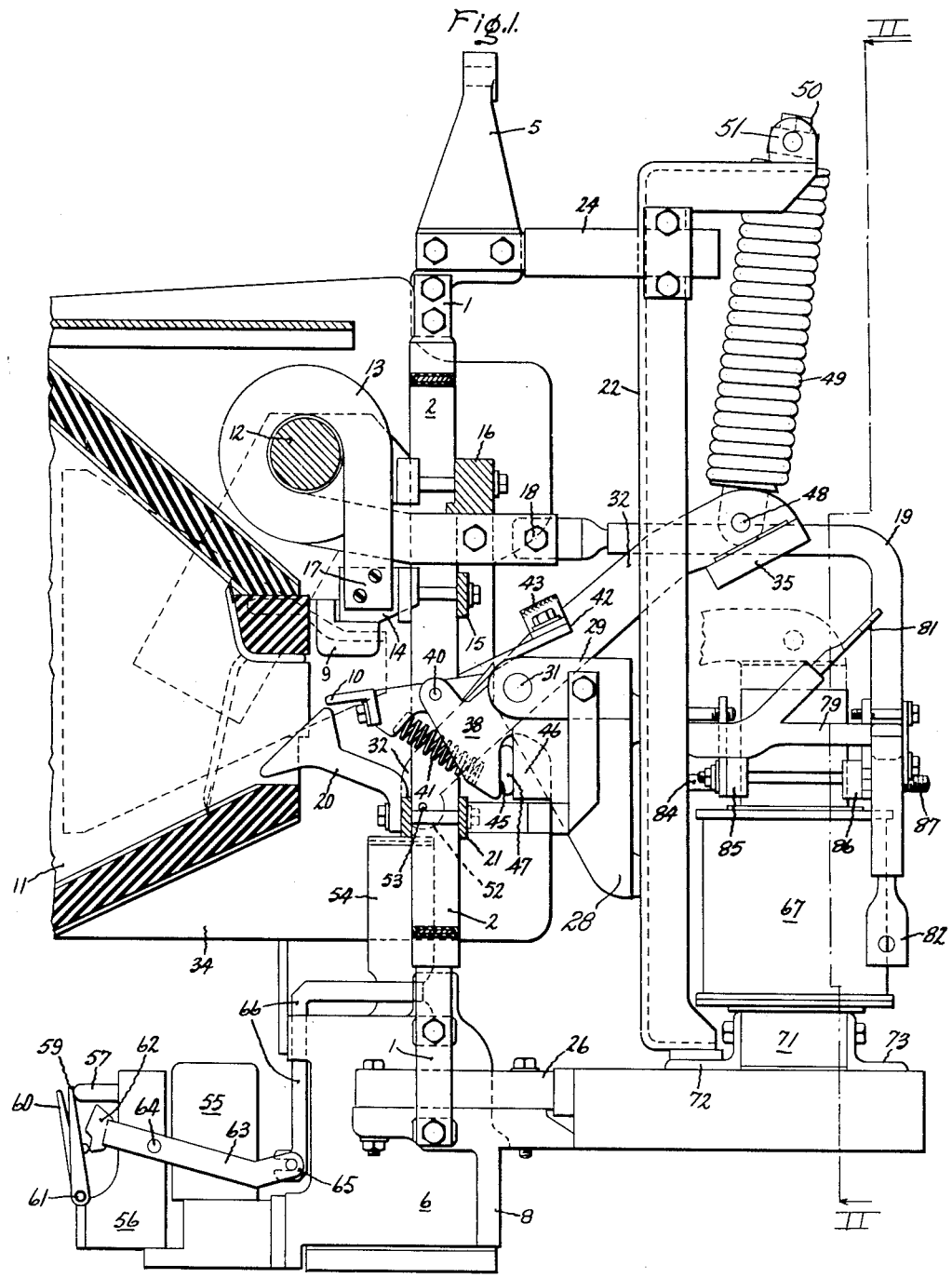
Fig. 1 is taken on the line I—I of Fig. 3.
Figure 2:
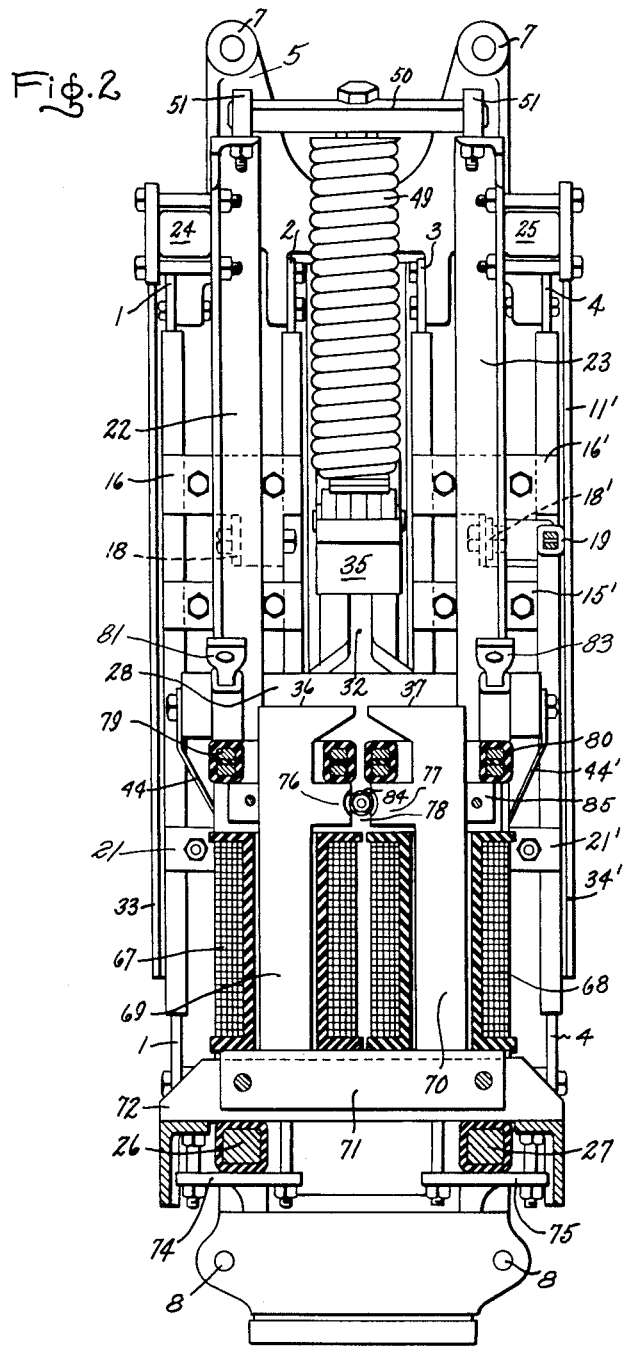
Fig. 2 is taken on the line II—II of Fig. 1, whilst
Figure 3:
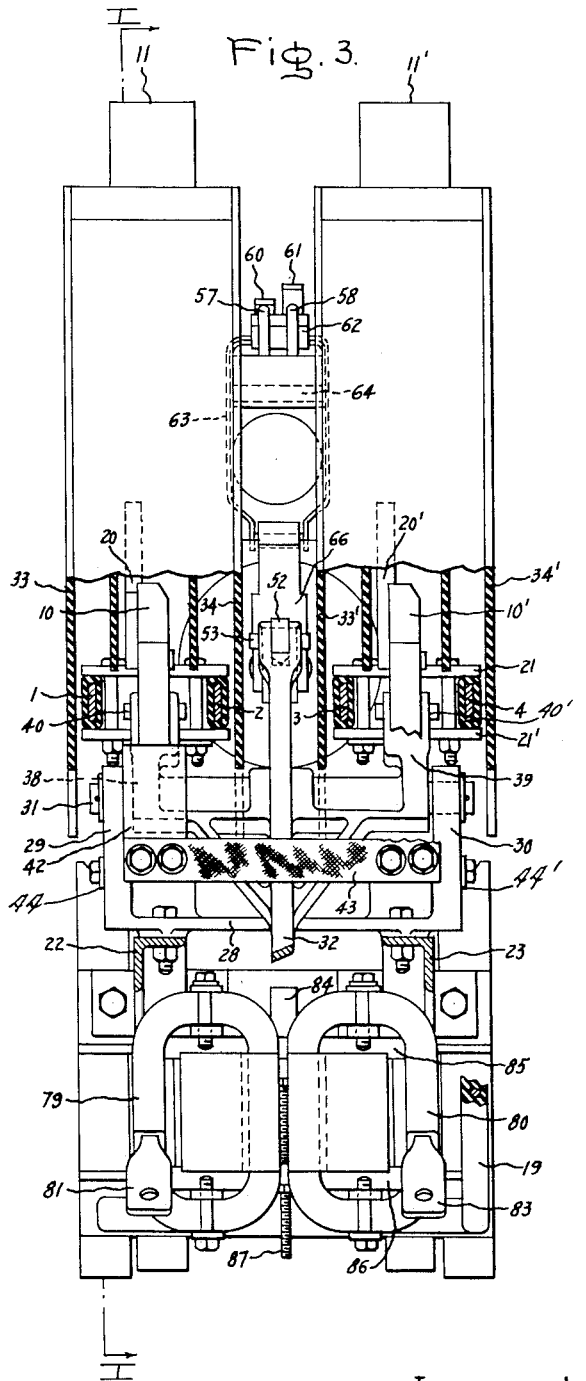
Fig. 3 is taken on various horizontal planes of Figs. 1 and 2 as will be apparent from the following description.

Referring to Figs. 1, 2 and 3, the various parts of the circuit breaker are mounted on a main framework comprising four vertical metal bars 1, 2, 3 and 4 which are bolted on their upper ends to a supporting bracket 5 and at their lower ends are bolted to faces on an operating air cylinder 6 of the circuit breaker. The upper bracket 5 is provided with perforated lugs 7 and the cylinder 6 is provided with perforated lugs 8. By means of these lugs the circuit breaker is adapted to be mounted in place on the usual framework for the line switches and contacts of the electric traction equipment in which the circuit breaker is employed.

The bars 1 and 2 support a fixed contact 9 with which cooperates a moving contact 10. An arc chute 11 is provided for controlling the arc drawn upon opening of the contacts. The bars 3 and 4 similarly support another fixed contact, the cooperating moving contact appearing at 10′ in Fig. 3 and the arc chute at 11′. The arc chutes may be of any suitable construction but are preferably of the character described and claimed in the complete specification of Letters Patent No. 478,824 aforesaid, to which attention is hereby directed. Each of the arc chutes is provided with a blow-out magnet and a blow-out coil, shown at 12 and 13 for the arc chute 11 in Fig. 1. The fixed contact 9 is secured to a bracket 14 preferably removably, which bracket is secured to the bars 1 and 2 by means of a cleat 15. The four bars are provided with coverings of insulating material. The blow-out magnet 12 is secured to the bars 1 and 2 by means of a cleat 16. The fixed contact and blow-out magnet associated with the arc chute 11′ is supported in similar manner from the bars 3 and 4, the corresponding cleats being shown in Fig. 2 at 15′ and 16′. One end of each blow-out coil is connected directly with the bracket supporting the associated fixed contact as shown at 17 in the case of the blow-out coil 13. The other end 18 of the coil 13 is connected in circuit as will hereinafter be described. The corresponding end 18′ of the other blow-out coil is connected with a conductor 19 as will hereinafter appear in more detail. Arcing horns 20 and 20′ are mounted by cleats 21 and 21′ on the bars 1, 2, 3 and 4. The ends of the arcs are moved by the blow-out magnets on to these arcing horns when the moving contacts move to the open position in line with the arcing horns.

The framework of the circuit breaker includes a pair of angle iron members 22 and 23 which are supported from the end bracket 5 and the air cylinder 6 by means of horizontal bars 24, 25, 26 and 27. A cast bracket 28 is bolted to the angle iron members 22 and 23, this bracket including at its ends trunnions 29 and 30 receiving a horizontal spindle 31. A contact carrying lever 32 is mounted on this spindle. This lever, which is conveniently a casting, comprises a main lever portion extending forwardly of the spindle 31 into the space between the arc chutes 11 and 11′. Conveniently as shown the arc chutes are provided with individual inclosures including insulating side partitions 33 and 34 and 33′ and 34′. The lever 32 comprises also a rearwardly extending portion which carries in rear of the angle iron members 22 and 23 a magnetic armature 35. This armature cooperates with upper polar faces 36, 37 of a U-shaped holding magnet supported by the frame members 26 and 27 and the arrangement of which will hereinafter be described in more detail. The contact carrying lever is formed adjacent the trunnions 29 and 30 with forwardly projecting arms 38 and 39 which at their upper and forward ends are bifurcated and support respectively the moving contacts 10 and 10′ by means of pins 40 and 40′. As will be seen the moving contacts are supported between the tines of the two arms by said pivot pins and are urged upwardly by means of compression springs of which that associated with the contact 10 appears at 41 in Fig. 1. These compression springs abut between the contact members 10 and 10′ and tail portions of the lever arms 38 and 38′ so as to urge the contact members upwardly whereby to provide in accordance with common practice a knuckling action of the moving contacts on engagement of the latter with the cooperating fixed contacts 9 and 9′. Preferably the moving contact fingers are provided with replaceable tips as illustrated, in accordance with the common practice.

The moving contacts 10 and 10′ are provided with rearwardly extending tail portions, that of the contact 10 appearing at 42 in Figs. 1 and 3 whilst that of the contact 10′ is in Fig. 3 broken away in order to show more clearly the arrangement of the end arm of the contact operating lever. The tail portions are connected directly together by a flexible copper conductor 43. By this means a circuit proceeds from the end 18 of the blow-out coil 13, through the latter to the fixed contact 9, the moving contact 10, the conductor 43, the moving contact 10′, the associated fixed contact, and the second blow-out coil to the end 18′ (Fig. 2) of said second blow-out coil.

Strap conductors 44 and 44′ are provided for connecting the cleats 21 and 21′ and thereby the arcing horns 20 and 20′ with the bracket 28 and thereby directly with the associated moving contacts 10 and 10′.

The forwardly extending arms 38 and 39 of the contact operating lever are provided with tail portions 45 (Fig. 1) adapted to cooperate with forward surfaces 46 (Fig. 1) on the bracket 28 so as to limit the downward movement of the contacts 10. Conveniently a horizontal buffer strip 47 is interposed between the tail portions 45 and surfaces 46.

The rearward end of the lever 32 has pivotal connection at 48 with the lower end of a tension spring 49 which at its upper end is anchored to a bar 50 which is pivotally supported in trunnions 51 mounted on the angle iron frame members 22 and 23, this spring thus urging the lever in the counter-clockwise direction in Fig. 1 to the illustrated contact open position.

A roller 52 is mounted in the forwardly extending end of the lever 32 by means of a pin 53. This roller is engaged by a horizontal upper surface of a tappet 54 which is carried by a vertical piston rod of the piston working within the air cylinder 6.

An electromagnetically operated control valve for the cylinder 6 is shown at 55. This valve is of the type commonly employed in electric traction equipment arranged so that energization of an operating coil thereof will apply air pressure to the piston, whilst de-energization of the coil will vent the cylinder to atmosphere.

An interlock assembly 56 is also mounted on the air cylinder 6 for operation by the piston. In the example shown the interlock contacts are of the kind comprising fixed butt contacts 57 and 58 (Figs. 1 and 3) and cooperating pivoted contact fingers 59 and 60 pivoted on an axis at 61. The contact fingers are provided with spring biasing means by which they are urged toward the cooperating fixed contacts and are adapted to be supplied from the latter by a cam member 62 of insulating material which is carried by a rocker arm 63 pivoted at 64 and having pin and slot engagement at 65 with an L-shaped operating member 66 which is carried by the piston rod.

The holding magnet is provided with a pair of main exciting coils 67 and 68 located respectively on the two limbs 69 and 70 of the magnet. These limbs are united by a horizontal yoke 71 which is clamped between the angle members 72 and 73 which are secured by cleats 74 and 75 to the bars 26 and 27, these cleats serving also to secure the lower ends of the angle members 22 and 23 to said bars. The limbs 69 and 70 are provided with main pole pieces extending toward one another and providing the surfaces 36 and 37 hereinbefore referred to for cooperation with the armature 35. The limbs are also provided with auxiliary pole pieces 76 and 77 which extend toward one another but are separated from one another by an air gap 78. Controlling windings 79 and 80 are mounted on the poles 69 and 70 above the auxiliary pole pieces 76 and 77, these controlling windings being connected in circuit as will hereinafter be described. The controlling winding 79 is provided with terminal ends 81 and 82 whilst the controlling winding 80 is provided with a terminal 83 (Fig. 3) at one end and at its other end comprises the conductor 19 hereinbefore referred to.

A cylindrical member 84 of steel or other magnetic material is located in the air gap 78. The member 84 is slidably located in a bore in a plate 85 which, together with a plate 86, is clamped to the poles of the magnet. Conveniently these plates may be provided with recesses in which the poles register whereby to provide rigidity of the magnet structure. The member 84 is attached to a threaded rod 87 which has screw threaded engagement in a bore in the plate 86 so that by rotation of the rod 87 the position of the member 84 within the air gap 78 may be adjusted axially and thereby the reluctance of said air gap is adjustable to determine the setting of the circuit breaker as will hereinafter appear.

The connections of the coils are shown in the simplified circuit diagram of Fig. 4, in which the current collector of the equipment is shown at 100, a traction motor armature and field winding at 101 and 102 respectively, the return conductor at 103 and variable series resistance at 104. It will be understood that the traction motor circuits although shown in simplified form in Fig. 4 may be of any desired kind such as provide resistance and series-parallel notching in the usual manner. The circuit proceeds from the collector 100 to the end 18 of the blow-out coil 13 (Fig. 1), through said coil to the fixed contact 9 from which, as hereinbefore described, the circuit proceeds through the moving contacts 10 and 10' to the fixed contact 9'. This contact 9' is connected directly with one end of the second blow-out coil 13' and thence through the conductor 19 to the controlling winding 80 and through the terminal end 83 to the traction motor circuits. In general the traction motor circuits will include a line switch of the usual construction, the contacts of which are shown at 105, controlled by an overload relay, the operating coil of which appears at 106. The traction motor circuits are connected with the return conductor 103 through the controlling winding 79. The holding coils 67 and 68 are connected for energization directly from the current collector, usually through control switches which will be operated only when the equipment is initially brought into operation or for resetting after tripping. The resetting arrangement will include also a circuit controlling the valve 55.

In Fig. 4 the operating coil for the line switch 105 is shown at OC105 and is connected in a circuit which includes two sets of interlock contacts 107 and 108. The contacts 107 are operated by the movements of the piston and in Fig. 1 comprises the contacts 57 and 59. These interlock contacts are arranged so as to close only when the piston is in the retracted position, that is to say in the condition shown in Fig. 1. The contacts 108 are operated by the lever 32 and may be of similar construction to those shown at 56 in Fig. 1, but with an operating arm corresponding with the arm 63 connected for operation by the lever 32. The interlock contacts 108 are arranged so as to be closed only when the circuit breaker is closed. It will be understood that the circuit of the coil OC105 will include in addition the usual overload relay contacts and resetting means as otherwise well known in the art.

In the operation of this arrangement, for closing the circuit breaker, the holding coils 67 and 68 will be energized and air pressure applied to the piston. The latter will therefore move upwardly in Fig. 1 and cause clockwise movement of the lever 32 so as to bring the contacts 10 and 10' into engagement with the corresponding fixed contacts and close the circuit through these contacts. At the same time the armature 35 will be brought into contact with the pole surfaces 36 and 37 and air pressure is then removed from the piston by de-energization of the operating coil of the air valve 55 so that the piston returns to its illustrated position. So long as the piston is away from the illustrated retracted position of Fig. 1, the interlock contacts 57 and 59 (107, Fig. 4) are opened so that the line switch contacts 105 cannot be closed. When the contacts 9, 10, 9', 10' have been closed, then the contacts 108 close and upon return of the piston to the retracted position the coil OC105 (Fig. 4) can be energized resulting in closure of the line switch and the motor can be energized under control of the usual master controller.

The coils 67 and 68 produce opposite polarity on the poles of the holding magnet, for example as illustrated by the arrows in Fig. 4. The coil 80 acts in opposition to the coil 68 whilst the coil 79 acts in the same direction as the coil 67, that is to say the coils 80 and 79 respectively oppose and assist the main excitation of the holding magnet. During normal conditions the current flowing in the coils 79 and 80 is the same and therefore acts in opposition to one another on the magnetic circuit, neutralizing one another so that the holding windings retain the armature 35 in the closed position indicated by broken lines in Fig. 1 and the contacts remain closed.

In the event of a ground fault occuring in the traction motor circuit at any point between the windings 80 and 79, the controlling winding 79 will be short-circuited to a degree dependent upon the severity of the fault. The full traction motor current, however, still flows through the controlling winding 80 which therefore overcomes the winding 68 to reduce the resultant magnetic flux passing through the armature 35 so that the latter is released and the contacts opened.

On the other hand, as hereinbefore set forth, excessive motor current will affect both poles of the holding magnet equally and the circuit breaker will remain in the closed position. The overload protection is provided in the usual way by the line switch 105.

What I claim is:

1. A circuit including a load device, a circuit breaker having a stationary contact and a cooperating movable contact connected in circuit with said load device comprising a holding magnet having a core with a main winding thereon providing main excitation thereto, an armature member connected to said movable contact and cooperating with said holding magnet thereby to hold said contacts closed, means arranged to bias said armature member away from said holding magnet thereby to open said contacts, and a pair of controlling windings on said holding magnet core respectively connected in circuit with said load device adjacent the ends thereof, one of said controlling windings being connected to assist said main winding and the other of said controlling windings being connected to oppose said main winding, an overload line switch having contacts connected in circuit with said load device, and means connected to said circuit breaker and operable thereby arranged to prevent closing of said line switch contacts when said circuit breaker contacts are open.

2. A circuit including a load device, a circuit breaker having a stationary contact and a cooperating movable contact connected in circuit with said load device and comprising a holding magnet having a core with a main winding thereon providing main excitation thereto, an armature member connected to said movable contact and cooperating with said holding magnet thereby to hold said contacts closed, contact closing means engaging said armature member and arranged to move the same into engagement with said holding magnet thereby to close said contacts, said contact closing means being movable out of engagement with said armature member whereby said armature may return to its open position upon de-energization of said holding magnet, means arranged to bias said armature member away from said holding magnet thereby to open said contacts, and a pair of controlling windings on said holding magnet respectively connected in the circuit of said load device adjacent the ends thereof, one of said controlling windings being connected to assist said main winding and the other of said controlling windings being connected to oppose said main winding, an overload line switch having contacts connected in circuit with said load device and having an operating coil, and a pair of interlock contacts respectively connected in series with said line switch operating coil, one of said interlock contacts being connected to said armature member and closed thereby responsive to closing of said circuit breaker contacts, the other of said interlock contacts being connected to said contact closing means and closed thereby in response to said contact closing means moving out of engagement with said armature member whereby said line switch operating coil is energized only when said circuit breaker contacts are closed and said contact closing means is moved out of engagement with said armature member.

3. An electric circuit breaker having two pairs of contacts connected in series, a pair of separate arc chutes associated respectively with said pairs of contacts, each of said pairs of contacs comprising a stationary contact and a cooperating movable contact, said pair of contacts being adapted to be connected in series with a load device, a holding magnet having a core with a main winding thereon providing main excitation thereto, an armature member connected to said movable contacts and cooperating with said holding magnet thereby to hold said contacts closed, means arranged to bias said armature member away from said holding magnet thereby to open said contacts, and a pair of controlling windings on said holding magnet core adapted to be respectively connected in the circuit of said load device adjacent the ends thereof, one of said controlling windings being arranged to assist said main winding and the other of said controlling windings being arranged to oppose said main winding.

4. An electric circuit breaker having a stationary contact and a cooperating movable contact adapted to be connected in circuit with a load device and comprising a holding magnet having a core with a main winding thereon providing main excitation thereto, a lever member pivoted intermediate the ends thereof having said movable contact mounted at one end thereof, an armature member mounted on the other end of said lever member and cooperating with said holding magnet core thereby to hold said contacts closed, means arranged to bias said lever member to hold said armature member away from said holding magnet core thereby to open said contacts, contact closing means engaging said lever member and arranged to actuate the same to move said armature member into engagement with said holding magnet core thereby to close said contacts, said contact closing means being movable out of engagement with said lever member whereby the same may return to its initial position upon demagnetization of said magnet, and a pair of controlling windings on said holding magnet core adapted to be respectively connected in the circuit of said load device adjacent the ends thereof, one of said controlling windings being arranged to assist said main winding and the other of said controlling windings being arranged to oppose said main winding.

5. An electric circuit breaker having a pair of contacts connected in series, a pair of separate arc chutes respectively associated with said pair of contacts, each of said contacts comprising a stationary contact and a cooperating movable contact, said contacts being adapted to be connected in circuit with a load device, a holding magnet having a core with a main winding thereon providing main excitation thereto, a lever member pivoted intermediate its ends, a pair of arms formed on one end of said lever member respectively carrying said movable contacts, another arm formed at the other end of said lever member, an armature member mounted on said other lever member arm and cooperating with said holding magnet core thereby to hold said contacts closed, means arranged to bias said other lever member arm to hold said armature member away from said holding member core thereby to open said contacts, contact closing means engagaing said other lever member arm and arranged to actuate the same to move said armature member into engagement with said holding magnet core thereby to close said contacts, said contact closing means being movable out of engagement with said other lever member arm whereby said lever member may return to its initial position upon de-energization of said magnet, and a pair of controlling windings on said holding magnet core adapted to be respectively connected in the circuit of said load device adjacent the ends thereof, one of said controlling windings being arranged to assist said main winding and the other of said controlling windings being arranged to oppose said main winding.

6. An electric circuit breaker comprising a pair of contacts connected in series, a pair of separate arc chutes associated respectively with said pair of contacts, each of said contacts comprising a stationary contact and a cooperating movable contact, said contacts adapted to be connected in circuit with a load device, a holding magnet having a core with a main winding thereon providing main excitation thereto, a lever member pivoted intermediate its ends, a pair of arms formed at one end of said lever member and respectively having said movable contacts mounted thereon, said lever member having another arm formed at its other end, an armature member mounted on said other arm and cooperating with said holding magnet core thereby to hold said contacts closed, means arranged to bias said other arm to hold said armature member away from said holding magnet core thereby to open said contacts, contact closing means engaging said other arm and arranged to actuate the same to move said armature member into engagement with said holding magnet core thereby to close said contacts, said contact closing means being movable out of engagement with said other arm whereby said lever member may return to its initial position upon de-energization of said magnet, said other arm being arranged for movement between said arc chutes, and a pair of controlling windings on said holding magnet adapted to be respectively connected in the circuit of said load device adjacent the ends thereof, one of said controlling windings being arranged to assist said main winding and the other of said controlling windings being arranged to oppose said main winding.

7. A circuit including a load device, a circuit breaker having a stationary contact and a cooperating movable contact connected in circuit with said load device and comprising a holding magnet having a core with a main winding thereon providing main excitation thereto, an armature member connected to said movable contact and cooperating with said holding magnet thereby to hold said contacts closed, means arranged to bias said armature away from said holding magnet thereby to open said contacts, a pair of controlling windings on said holding magnet core respectively connected in the circuit of said load device adjacent the ends thereof, one of said controlling windings being arranged to assist said main winding and the other of said controlling windings being arranged to oppose said main winding.

8. A circuit including a power terminal and a ground return line, a direct current load device, a circuit breaker having a stationary contact and a cooperating movable contact connected in circuit with said load device and comprising a holding magnet having a core with a main winding thereon providing main excitation thereto, an armature member connected to said movable contact and cooperating with said holding magnet thereby to hold said contacts closed, means arranged to bias said armature away from said holding magnet thereby to open said contacts, and a pair of similar controlling windings on said holding magnet core respectively connected in the circuit of said load device adjacent the ends thereof, the first of said controlling windings being arranged to assist said main winding and the second of said controlling windings being arranged to oppose said main winding, said first control winding being connected at the ground return line whereby a ground fault between said controlling windings will be detected.

9. An electric circuit breaker having a stationary contact and a cooperating movable contact adapted to be connected in circuit with a load device to protect the device from ground faults and comprising a holding magnet having a core with a main winding thereon providing an excitation thereto, an armature member connected to said movable contact and cooperating with said holding magnet thereby to hold said contacts closed, contact closing means engaging said armature member and arranged to move the same into engagement with said holding magnet thereby to close said contacts, said contact closing means being movable out of engagement with said armature member whereby said armature member may be returned to its open position upon de-energization of said holding magnet, means arranged to bias said armature member away from said holding magnet thereby to open said contacts, a pair of controlling windings on said holding magnet adapted to be respectively connected in the circuit of said load device adjacent the ends thereof, one of said controlling windings being arranged to assist said main winding and the other of said controlling windings being arranged to oppose said main winding, a pair of auxiliary pole pieces connected to said core between said main winding and said control windings to provide an auxiliary high reluctance flux path therebetween, and a magnetic cylindrical member adjustably positioned in the gap between said auxiliary pole pieces to provide a control of the reluctance of said high reluctance path.

References Cited in the file of this patent

UNITED STATES PATENTS

| | | |
|---|---|---|
| Re. 15,441 | Tritle | Aug. 29, 1922 |
| 1,427,368 | Fortescue et al. | Aug. 29, 1922 |
| 1,560,440 | Tritle | Nov. 3, 1925 |
| 1,565,410 | Boddie | Dec. 15, 1925 |
| 1,597,750 | Aalborg | Aug. 31, 1926 |
| 1,631,726 | Hastings et al. | June 7, 1927 |
| 1,658,329 | Forsberg | Feb. 7, 1928 |
| 1,671,471 | Fortescue | May 29, 1928 |
| 1,730,881 | Fortescue | Oct. 8, 1929 |
| 1,837,977 | McNairy et al. | Dec. 22, 1931 |
| 1,920,745 | Gunholz | Aug. 1, 1933 |
| 2,130,872 | Boehne | Sept. 20, 1938 |

FOREIGN PATENTS

| | | |
|---|---|---|
| 123,402 | Switzerland | Nov. 16, 1927 |
| 132,138 | Switzerland | June 1, 1929 |
| 302,048 | Great Britain | Dec. 13, 1928 |
| 303,835 | Great Britain | Apr. 10, 1930 |
| 402,729 | Great Britain | Feb. 29, 1932 |
| 499,158 | Germany | June 3, 1930 |
| 532,028 | Germany | Aug. 25, 1931 |